US009338699B2

(12) United States Patent
Li et al.

(10) Patent No.: US 9,338,699 B2
(45) Date of Patent: May 10, 2016

(54) SCHEME OF RETAINING LTE CONNECTION DURING CIRCUIT SWITCH FALL BACK

(71) Applicants: Weigang Li, Ottawa (CA); Indranil Tapadar, Ontario (CA); Guoqiang Xue, Kanata (CA)

(72) Inventors: Weigang Li, Ottawa (CA); Indranil Tapadar, Ontario (CA); Guoqiang Xue, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 143 days.

(21) Appl. No.: 14/107,010

(22) Filed: Dec. 16, 2013

(65) Prior Publication Data

US 2014/0177592 A1    Jun. 26, 2014

Related U.S. Application Data

(60) Provisional application No. 61/740,013, filed on Dec. 20, 2012.

(51) Int. Cl.
*H04W 36/00* (2009.01)
*H04W 76/04* (2009.01)
*H04W 76/02* (2009.01)

(52) U.S. Cl.
CPC ........ *H04W 36/0022* (2013.01); *H04W 76/045* (2013.01); *H04W 76/028* (2013.01)

(58) Field of Classification Search
CPC ............ H04W 36/0022; H04W 76/00–76/068
See application file for complete search history.

(56) References Cited

U.S. PATENT DOCUMENTS

| 2011/0176485 | A1 | 7/2011 | Pudney et al. |
| 2011/0222509 | A1 | 9/2011 | Lee |
| 2011/0268109 | A1* | 11/2011 | Miyata ........................... 370/352 |
| 2012/0120789 | A1 | 5/2012 | Ramachandran |
| 2012/0257494 | A1 | 10/2012 | Chin |
| 2013/0230024 | A1* | 9/2013 | Lim et al. ....................... 370/331 |
| 2013/0308527 | A1* | 11/2013 | Chin et al. .................... 370/328 |

FOREIGN PATENT DOCUMENTS

| WO | 2008148431 A1 | 12/2008 |
| WO | 2011073849 A1 | 6/2011 |
| WO | 2011073884 A1 | 6/2011 |
| WO | 2011073910 A1 | 6/2011 |
| WO | 2012037280 A1 | 3/2012 |
| WO | WO 2012/066759 | * 5/2012 ............ H04W 48/18 |

OTHER PUBLICATIONS

Evolve to richer voice with Voice over LTE (VoLTE): Winning the revenue advantage with LTE smartphones, Nokia Siemens Networks, Finland, 2012.

* cited by examiner

*Primary Examiner* — Pao Sinkantarakorn
(74) *Attorney, Agent, or Firm* — Ericsson Canada Inc.; Jean-Pierre Fortin

(57) ABSTRACT

The present solution enables a packet switched connection to be temporarily released at the wireless terminal for supporting voice calls over a Circuit-Switched (CS) Fallback. The packet switched connection of the LTE core network retained for a pre-defined period of time during the CSFB session allowing the user to quickly switch back to the packet switched connection when the CSFB session is shorter than the predefined period or when the voice call CSFB attempt fails. This is accomplished by the introduction of a timed buffer to control the length of time the LTE core network connection and wireless context information will be retained.

18 Claims, 7 Drawing Sheets

SCHEME OF RETAINING LTE CONNECTION DURING CIRCUIT SWITCH FALL BACK

FIELD OF TECHNOLOGY

The present application relates generally to the handling of circuit switched calls on an LTE network but more particularly to management of a packet switched connection during circuit switch fall back (CSFB).

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the 3rd Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Serving Gateways (SGWs), or Mobility Management Entity (MME) rather than to radio network controller (RNC) nodes. In LTE, the functions of a radio network controller (RNC) node are distributed between the radio base stations nodes (eNodeB's in LTE), MME and SGWs. As such, the radio access network (RAN) of an LTE system has an essentially "flat" architecture comprising radio base station nodes without reporting to radio network controller (RNC) nodes.

Cellular Circuit-Switched (CS) telephony was introduced in the first generation of mobile networks. Since then CS telephony has become the largest service in the world with approximately 4 billion subscriptions sold. Even today, the main part of the mobile operator's revenue comes from the CS telephony service (including Short Message Services (SMS)), and the 2G GSM networks still dominate the world in terms of subscriptions, with 3G subscriptions increasing in volume.

The long-term evolution (LTE) project within 3GPP aims to further improve the 3G standard to, among other things, provide even better mobile broadband to the end users (higher throughput, lower round-trip-times, etc.).

By employing shared pipe and packet data scheduling, LTE offers many advantages over the previous 2G and 3G technologies. These include better usage of the available spectrum, much higher data rate, lower latency and simplified network architecture. Although LTE is a wireless technology optimized for packet data transfer, it can also be used to deploy traditional CS-domain services such as voice and SMS. Delivering voice and SMS services over a LTE network requires not only LTE access network, IMS and IP core networks are also essential. During the early stage of LTE roll-out, voice service is not supported by LTE natively. The standards bodies have provided solutions for traditional CS-domain services to coexist with LTE.

However, due to the nature of packet data, LTE has to fall back to 2G or 3G to handle circuit switched voice calls. One solution for supporting voice is called Circuit-Switched (CS) Fallback. This allows an LTE device to drop back to the legacy 2G/3G network when IMS VoLTE capabilities are not in place. The UE normally camps on the LTE network, and must "fallback" to a 2G or 3G network to use the CS domain in order to receive or place a voice call.

Unfortunately, during Circuit Switch Fall Back (CSFB), the LTE connection has to be released. This may cause some undesired outcomes. For instance, when CSFB occurs during an on-going FTP session, the FTP session will be torn down. When the LTE connection resumes, the FTP session needs to start over. A large amount of previously downloaded/uploaded could be lost or wasted.

There are 2 issues associated with releasing the LTE connection. The first is associated with the tearing down of the LTE connection, which can be problematic for applications such as FTP and gaming due to total loss of a FTP or gaming session. The second is the extra time required to bring down the LTE connection, which may introduce excessive delay in setting up the CS domain service, which leads the end user to believe the set-up has failed, thus gives up the attempt prematurely. Human behavior often causes a call to be de-activated after a prolonged delay and especially when the end user gives up the call attempt before the called party has time to respond.

Some scenarios are envisaged wherein a wireless terminal camps on both the LTE network and the 2G or 3G network. Such a scenario is described in applicant's co-pending patent applications WO2011/073884, WO2011/073849 and WO2011/073910. However, the ability to maintain parallel registration in two networks is not feasible in some networks and by some wireless terminals. In fact, some devices and networks cannot maintain both a packet-switched connection and a circuit-switched connection simultaneously.

Accordingly, a need exists for a method and system to retain a packet switched session on an LTE core network for a pre-defined period of time while a wireless terminal switches over to a CSFB session.

SUMMARY

The present innovative solution introduces a mechanism to retain a packet switched session during CSFB. The present solution enables a packet switched session to be temporarily released by the wireless terminal for supporting voice calls over a Circuit-Switched (CS) Fallback. The packet switched session at the LTE core network is retained for a pre-defined period of time during the wireless terminal's CSFB session allowing the user to quickly switch back to the packet based session on LTE core network when the CSFB session is shorter than the predefined period or when the voice call CSFB attempt fails. This is accomplished by the introduction of a timed buffer to control the length of time the LTE core network connection and wireless terminal context information will be retained.

In one of its aspects, the technology disclosed herein concerns in a Long Term Evolution (LTE) core network, a method of retaining a packet switched session during a circuit-switch fallback connection attempt between a wireless terminal and Circuit Switched (CS) core network. The method comprises receiving a circuit-switch connection request at a node serving said wireless terminal and instructing the serving node to release the packet switched session between the wireless terminal and the serving node but delay the release of the packet switched session between the serving node and the LTE core network. The method further comprises forwarding the circuit switched connection request to the wireless terminal to establish a CSFB session on the CS core network and initiating a timer indicative of the time limit the wireless terminal's CSFB session is retained.

In an example implementation, the wireless terminal configured, when already having a registration and/or session for a packet switched service with a Long Term Evolution (LTE) core network, to make a registration for a circuit switched fall back (CSFB) session with a circuit switched (CS) core network. The wireless terminal being characterized in that, in conjunction with the registration for the circuit switched (CSFB) session, the wireless terminal is configured to release the packet switched session with a serving node of the LTE core network but delay the release of context information associated with the packet switched session such that when the circuit switched registration is terminated, the wireless terminal can re-establish the original packet switched session with the serving node of the (LTE) core network.

In another of its aspects, the technology disclosed herein concerns A method of operating a wireless terminal comprising when already having a registration and/or session for a packet switched (PS) service with a Long Term Evolution (LTE) core network, making a registration for a circuit switched fall back (CSFB) session over a CS air interface with a circuit switched (CS) core network. The method is characterized by releasing the packet switched session with a serving node of the LTE core network but delaying the release of context information associated with the packet switched session such that when the circuit switched registration is terminated, the wireless terminal can re-establish the original packet switched session with the serving node of the (LTE) core network.

Other aspects and features of the present solution will become apparent to those of ordinary skill in the art upon review of the following description of specific embodiments in conjunction with the accompanying figures.

DETAILED DESCRIPTION

Figure 1:
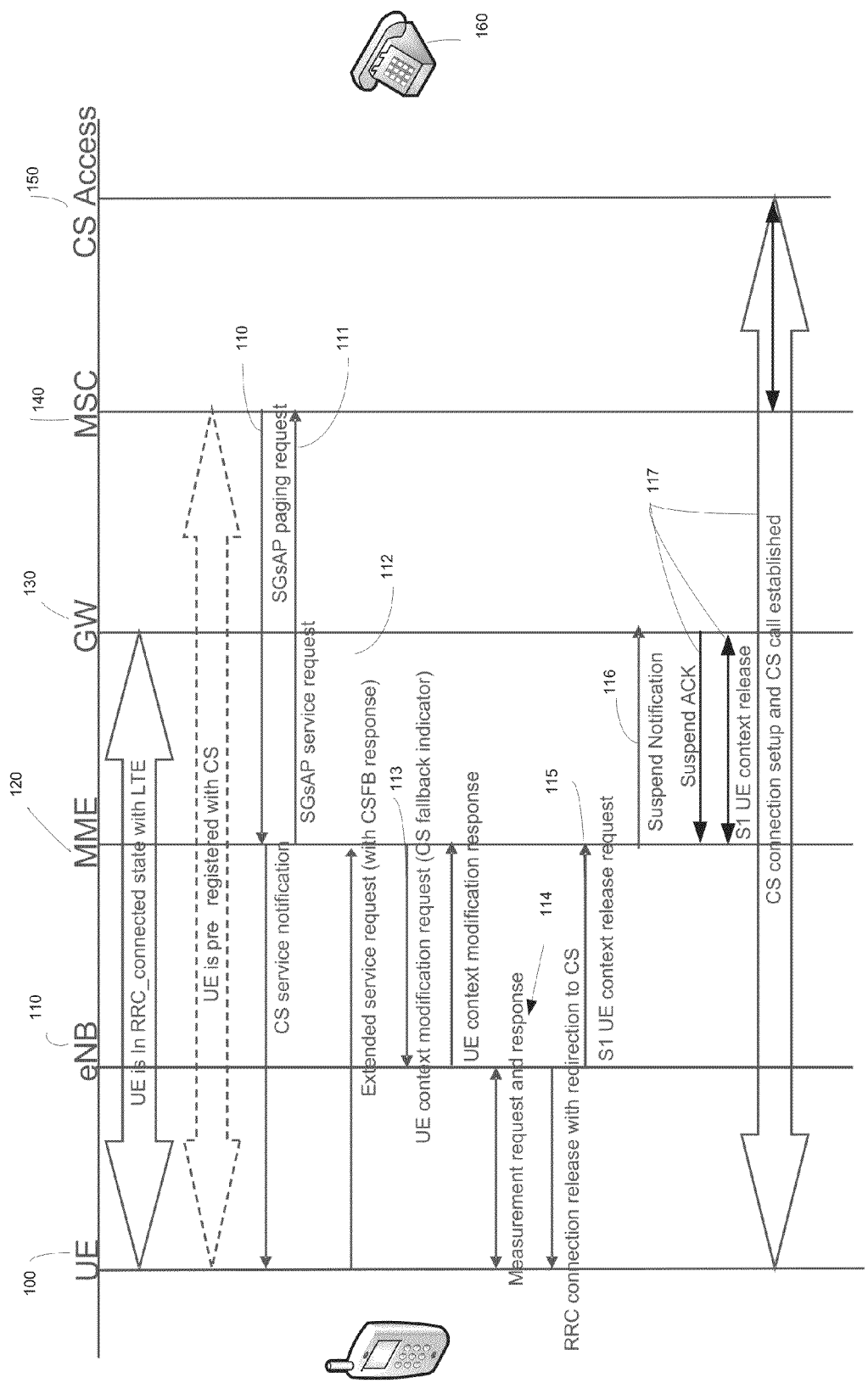
FIG. 1 is a diagrammatic view illustrating example acts, steps, or events involved in a typical CSFB session as it exists today.

In order to lighten the following description, the following acronyms will be used:
CQI Channel Quality Indicator
CS Circuit-Switched
CSFB Circuit Switch Fall Back
DMRS Demodulation Reference Signal
DRX Discontinuous Reception
E-UTRAN Evolved Universal Terrestrial Radio Access
IWS Interworking Server
LTE Long Term Evolution
MME Mobility Management Entity
PLMN Public Land Mobile Network
PMI Precoding Matrix Indicators
RAN Radio Access Network
RRC Radio Resource Control
SMS Short Message Service
SRS Sounding Reference Signal
TA Tracking Area
UE User Equipment In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo-code, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

As used herein, a "request to participate" in a circuit switched call comprises either a request to establish the circuit switched call or a response to a page for the circuit switched call.

If we now refer to FIG. 1, we have shown a flow diagram illustrating the exchange of requests and acknowledgements messages when a UE receives a call request from a circuit switched apparatus. These messages involve the participation of a number of network elements for the establishment of the circuit switched call. The participation steps are illustrated in FIG. 1, wherein messages are exchanged between the UE 100, evolved NodeB 110, Mobility Management Entity (MME) 120, Gateway (GW) 130, Mobile Switching Center (MSC) 140, Circuit Switched (CS) Access 150 and the CS apparatus 160. In a typical call flow during non-voice communication events, the UE 100 is in a connected mode 101 on the LTE network to the Gateway 130. It should be noted that the UE is pre-registered 102 with the Circuit Switched network via the MSC 140 upon entering the MSC CS cell service area. The GW 130 routes and forwards user data packets, while also acting as the mobility anchor for the user plane during inter-eNB handovers and as the anchor for mobility between LTE and other 3GPP technologies (terminating S4 interface and relaying the traffic between 2G/3G systems and the Packet Data Network GW (PDN GW)). The PDN GW provides connectivity to the UE to external packet data networks by being the point of exit and entry of traffic for the UE. A UE may have simultaneous connectivity with more than one PDN GW for accessing multiple PDNs. The PDN GW performs policy enforcement, packet filtering for each user, charging support, lawful Interception and packet screening.

In operation, if a circuit switched call is directed to the UE, the MSC 140 sends a CS service notification request 103 via the MME 120 to the UE 100. The Mobility Management Entity (MME) 120 manages and stores UE context (for idle state: UE/user identities, UE mobility state, user security parameters). It generates temporary identities and allocates them to UEs. It checks the authorization whether the UE may camp on the TA or on the PLMN. The TA represents the tracking area location of mobiles that are in idle mode. The MME will also authenticate the user. The MME 120 responds to the MSC 140 with an acknowledgement message 104. If the UE 100 accepts the request, a response 105 is sent to the MME 120. The MME 120 then requests 106 from the eNB 110 the UE context modification information. The eNB 110 then monitors measurement data 107 from the UE 100 and if an acceptable call environment is determined, the eNB 110 sends an RRC connection release message to the UE 100 for redirection to a CS session 108. A S1 UE context release request is then sent from the eNB 110 to the MME 120 which exchanges with the GW 130 a suspend notification, suspend acknowledgement and S1 UE context release message 109. The UE 100, released from its LTE connection then proceeds with establishment of a circuit switched connection 111 with the CS apparatus 160.

Figure 2:
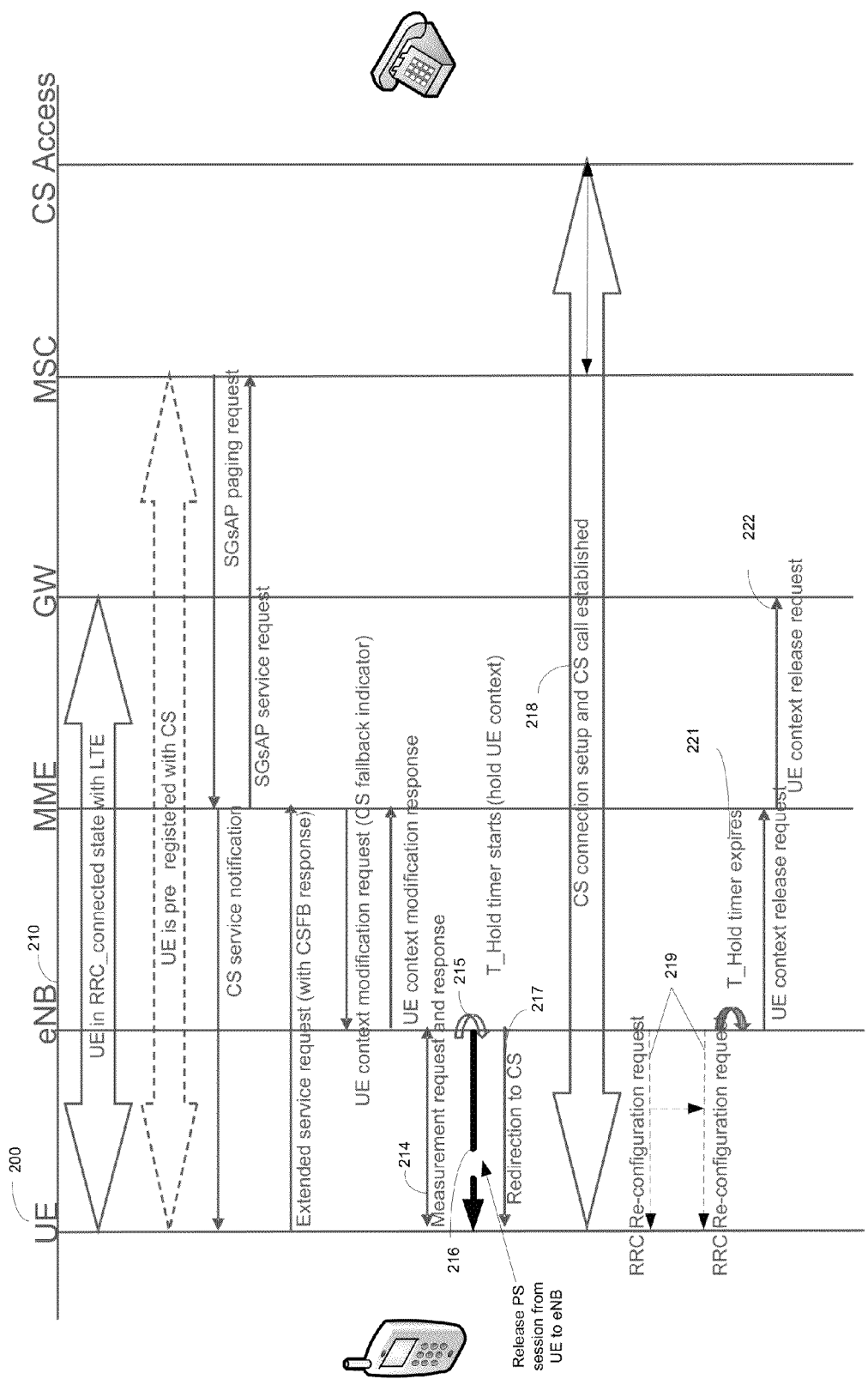
FIG. 2 is a diagrammatic view illustrating example acts, steps, or events involved in a CSFB session according to a first exemplary embodiment of the present invention.
Figure 3A:
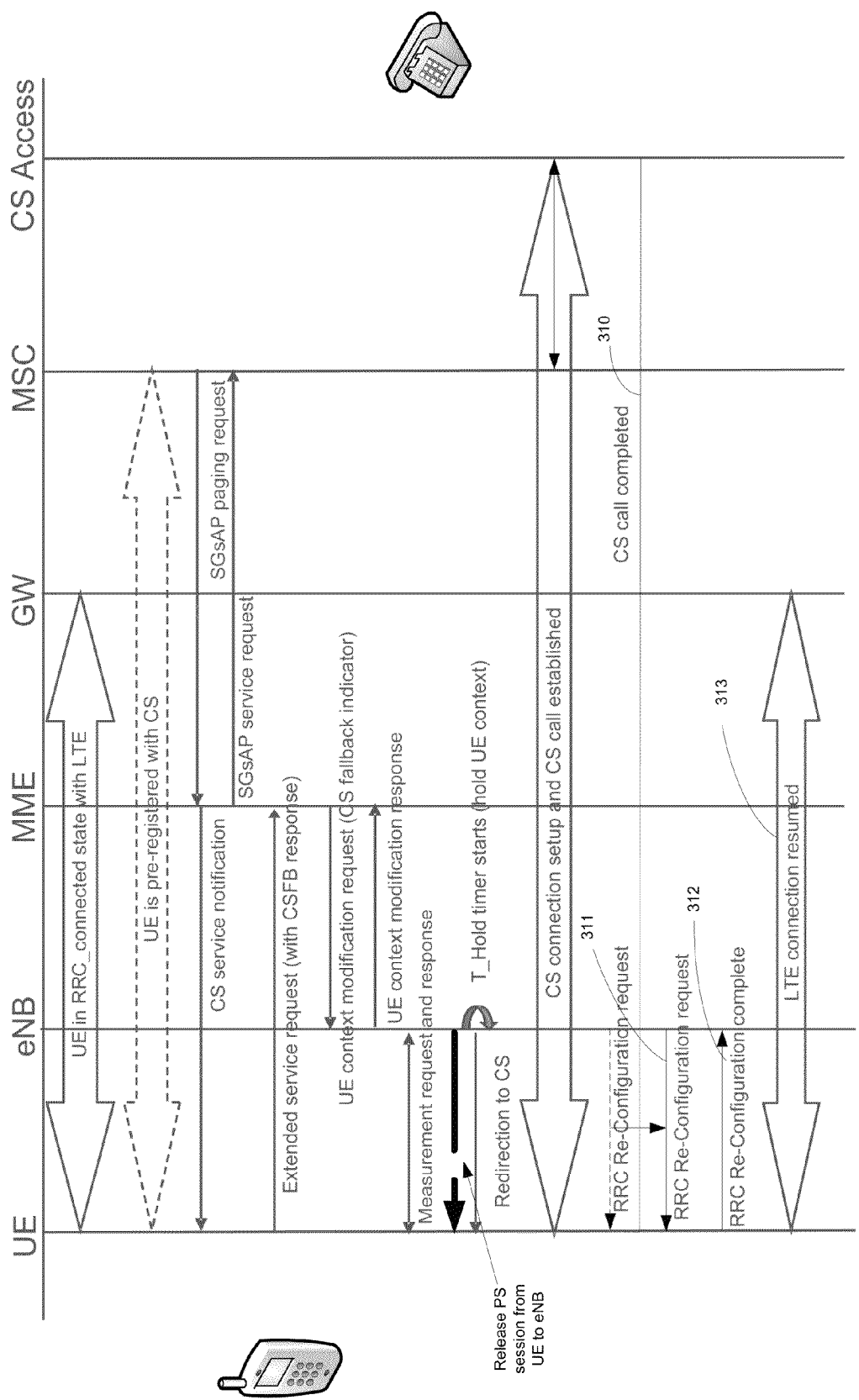
FIG. 3a is a diagrammatic view illustrating example acts, steps, or events involved in a CSFB session according to another exemplary embodiment of the present invention.
Figure 3B:
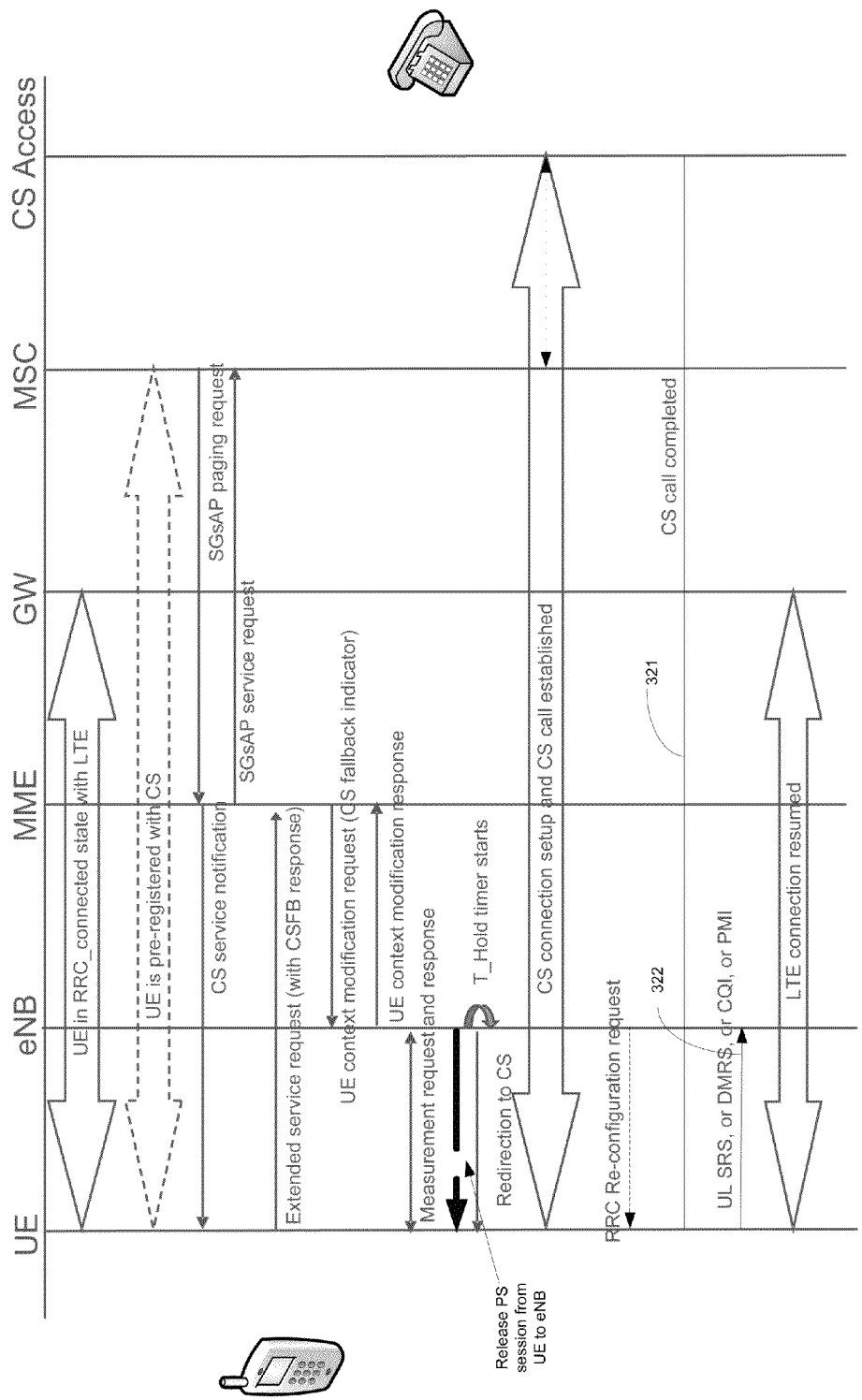
FIG. 3b is a diagrammatic view illustrating example acts, steps, or events involved in a CSFB session according to another exemplary embodiment of the present invention.

FIGS. 2, 3a and 3b describe modified call flows according to exemplary embodiments of the present solution. The present solution provides a mechanism to retain LTE connection for a pre-defined period of time during a CSFB session. The proposed scheme allows a UE to quickly switch back to a PS session on the LTE network when the CSFB session is shorter than a predefined time period or when the 2G/3G CSFB attempt fails. A hold timer or timed buffer is used as the means for keeping track of the predefined period and to determine when to trigger the release of the PS session on the LTE network if the CSFB session is longer than the predefined time period.

In the call flow scenario illustrated in FIG. 2, the end user UE is, as in the call flow of FIG. 1, engaged or in a connected state with the LTE network. As in the call flow described with reference to FIG. 1, prior to transferring or establishing a CSFB session with the UE 200, the eNB 210 monitors measurement data 214 from the UE 200 and if there is an acceptable call environment, the eNB 210 starts the Hold timer session 215, releases the UE from its LTE connection 216 and redirects the UE to the CS call 217. In particular, when a 2G/3G CSFB connection set-up attempt arrives at LTE RAN, the UE RRC connection and UE context are retained as opposed to being released as in conventional CSFB case, illustrated in FIG. 1. The LTE eNB treats the UE as if there is no traffic. A new timer, T_hold, is introduced to control how long the LTE RRC connection and UE context will be retained on the eNB side of the network. On the UE side, the UE also keeps the LTE access context and RRC connection until T_hold is expired.

During the CS connection setup and call 218, the eNB sends a RRC Re-configuration request 219 to the UE at regular intervals. The RRC re-configuration request is used as a means for the eNB to monitor if the UE is still on a CS session. In the call scenario of FIG. 2, the T_hold timer expires 221 prior to the completion of the CS session. The UE context is therefore released 222 and UE RRC connection is torn down.

The amount of time the T_Hold timer is set can be configured by the service provider and can range from 5 to 10 seconds. The service provider can tailor the length of time the hold timer is used since holding the link for a user will require use of network resources. The hold timer can be made to vary based on network usage, quality of service, etc. Similarly, the service provider can dynamically vary the duration that the hold timer is active based on the aforementioned conditions.

In the examples of FIGS. 3a and 3b, the CSFB sessions end before the T_hold timer expires, the UE context and RRC connection can be reused, thus avoiding the need to re-establish the connection.

In the call scenario of FIG. 3a, the establishment of the CS session is similar to what is shown in FIG. 2. However, in the scenario of FIG. 3a, after the UE ends the CS session 310, it continues to receive an RRC re-configuration request 311 at a regularly scheduled interval and the UE, having just terminated the CS session sends an RRC re-configuration complete reply 312 to the eNB in response to request 311. The eNB makes use of the UE context information held during the CS session to re-establish the PS connection 313.

In the call scenario of FIG. 3b, the PS session is resumed after the termination of the CS session 321 before the transmission or re-transmission of a RRC re-configuration request from the eNB to the UE. That is, when the eNB receives either an uplink SRS, RMRS, CQI or PMI message 322 on the PCCH channel from the UE.

Figure 4:
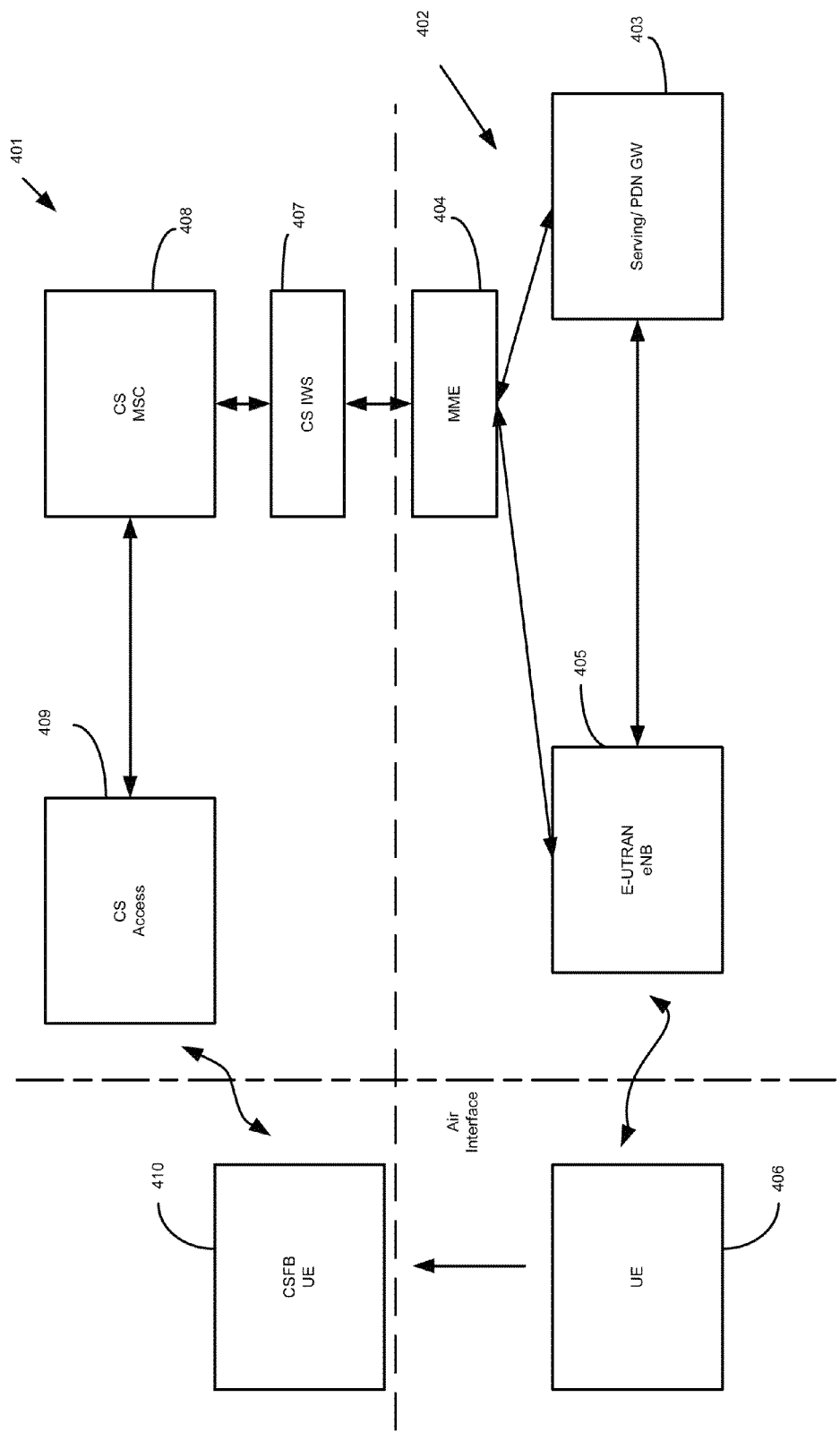
FIG. 4 is a block diagram illustrating how the main elements of a packet and circuit switched network to enable a circuit switch fall back session.

FIG. 4 is a block diagram illustrating the main elements of a typical circuit switched network 401 and those of a LTE packet switched network 402. As described earlier, the packet switched LTE network is comprised of a serving or packet data network gateway 403, a Mobility Management Entity (MME) 404 which manages and stores UE context (for idle state: UE/user identities, UE mobility state, user security parameters) and the Evolved-UTRAN enodeB 405 which interfaces with the UE 406. On the circuit switched side of the network, a Circuit Switched Interworking Server (CS IWS) 407 interfaces with the MME and the Circuit Switched and the Mobile Switching Center (MSC) 408 and the Circuit Switched Access 409 to interface with the UE 410 when on the CSFB session.

Figure 5:
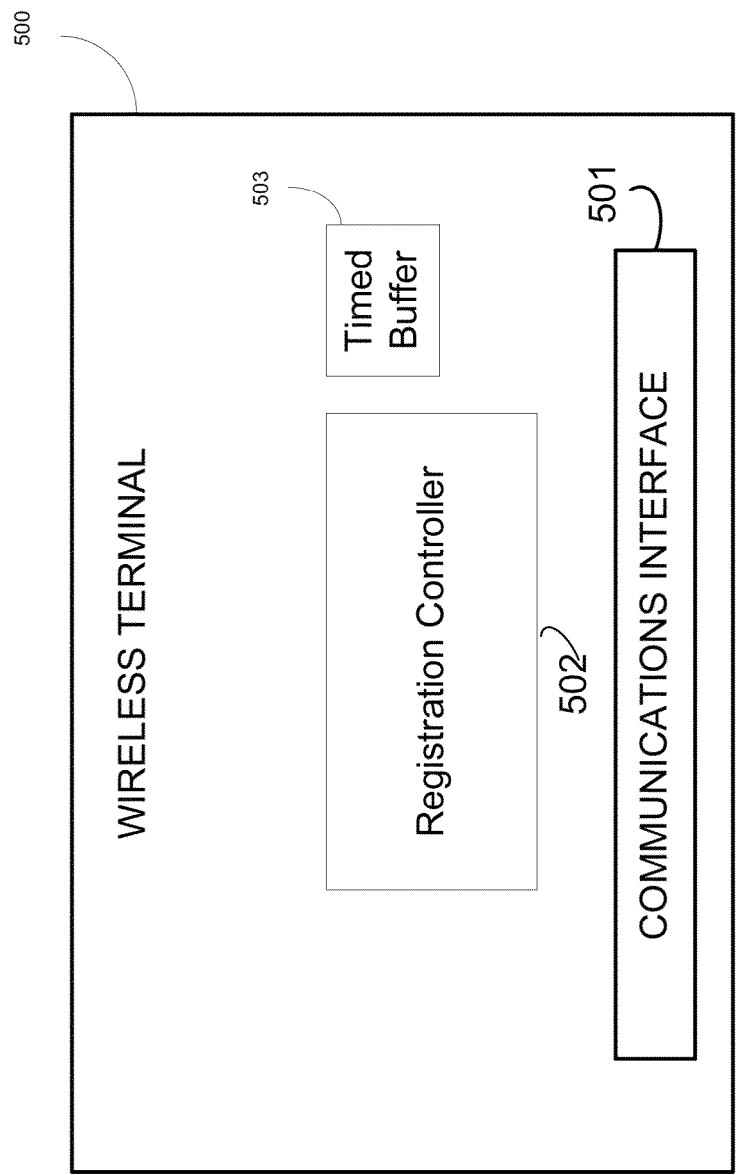
FIG. 5 is a schematic view of an example embodiment of a wireless terminal.

FIG. 5 shows an example, generic, and basic embodiment of a UE or wireless terminal 500. As shown in FIG. 5, wireless terminal 500 comprises communication interface 501 and registration controller 502 and timed buffer 503. The communication interface 502 is arranged to engage in communications over an air interface, such communications including a message configured to make the registration for the circuit switched (CS) session. The registration controller 502 is configured to make the registration for the circuit switched (CS) session over the Wide Band Code Division Multiplexing (WCDMA) air interface with the circuit switched (CS) core network while maintaining the wireless terminal's context information until such that as it is re-connected to a packet switched (PS) service with the Long Term Evolution (LTE) core network.

Figure 6:
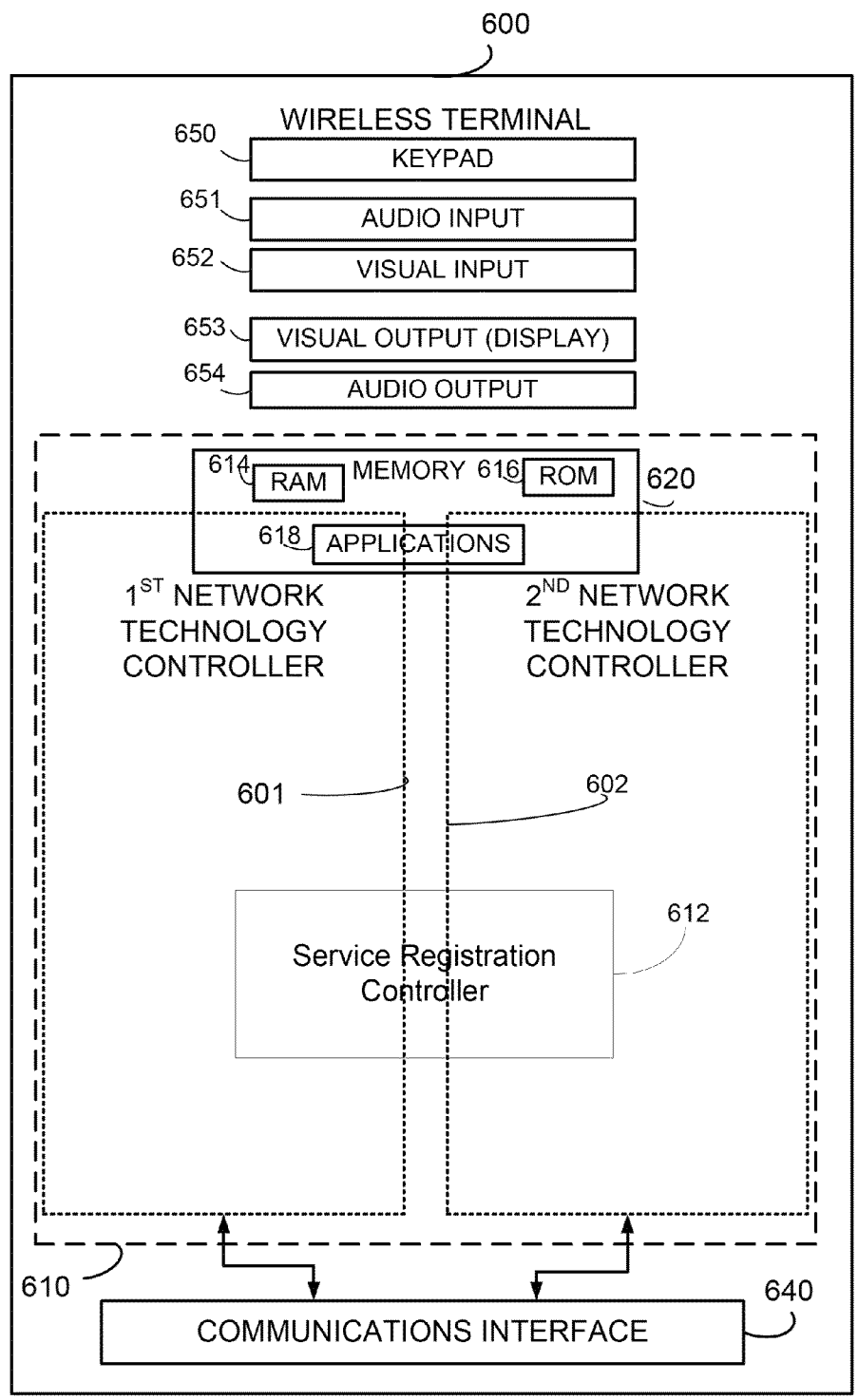
FIG. 6 is a more detailed schematic view of an example embodiment of a wireless terminal showing a platform implementation.

FIG. 6 shows a more detailed example embodiment of a wireless terminal 600 comprising a first controller 601 configured to handle administration and transmissions of LTE network and second controller 602 configured to handle administration and transmissions of the WCDMA network for circuit switched sessions. First controller 601 and second controller 602 can be realized or implemented by a same processor or controller (or processor system), and in such case may constitute separate sets of non-transitory executable signals (e.g., programs or routines stored on tangible media).

FIG. 6 further shows that certain functionalities of the example wireless terminal 600 can be realized by and/or provided on a platform 610. The terminology "platform" is a way of describing how the functional units of a communications unit or node can be implemented or realized by machine. One example platform is a computer implementation wherein one or more of the elements framed by line 610, including but not limited to registration controller 612.

In one example implementation, these functionalities shown as framed by platform 610 and even other functionalities can be realized by one or more processors which execute coded instructions stored in memory (e.g., non-transitory signals) in order to perform the various acts described herein. In such a computer implementation the wireless terminal can comprise, in addition to a processor(s), a memory section 620 (which in turn can comprise random access memory 614; read only memory 616; application memory 618 (which stores, e.g., coded instructions which can be executed by the processor to perform acts described herein); and any other memory such as cache memory, for example). Memory section 620 is used perform the T hold timer and to store the UE context and RRC connection information during the CSFB session.

Whether or not specifically illustrated, typically the wireless terminal of each of the embodiments discussed herein can also comprise certain input-output units or functionalities, the representative input/output units for wireless terminal being illustrated in FIG. 6 as keypad 650; audio input device (e.g. microphone) 651; visual input device (e.g., camera) 652; visual output device (e.g., display 653); and audio output device (e.g., speaker) 654. Other types of input/output devices can also be connected to or comprise wireless terminal 600.

In the example of FIG. 6, the platform 610 has been illustrated as computer-implemented or computer-based platform. Another example platform 610 for wireless terminal can be that of a hardware circuit, e.g., an application specific integrated circuit (ASIC) wherein circuit elements are structured and operated to perform the various acts described herein.

Furthermore, it will be appreciated that, as used herein, "wireless terminal(s)" or "UE" can be mobile stations or user equipment units (UE) such as but not limited to mobile telephones ("cellular" telephones) and laptops with wireless capability), e.g., mobile termination), and thus can be, for example, portable, pocket, hand-held, computer-included, or car-mounted mobile devices which communicate voice and/or data with radio access network.

For FTP and gaming applications, the present solution will appear to "pause" the application during a CSFB session and will resume when the CSFB session is completed. In the case of conventional CSFB, the FTP and gaming sessions would be released. Resuming the LTE connection would not be possible after the CSFB.

The present solution also makes it possible for a UE to quickly resume LTE applications in case the CS-domain access fails or for other reasons. Since the present solution will greatly improve user experience when the duration of CSFB session is less than a pre-defined period, the service provider may charge a premium fee for the use of such a service.

One advantage of the proposed solution is improved user experience. CSFB has lower call success rates due to additional latency. The long switchover time between LTE and other RAN(S) increases the chance that the calling party gives up before the circuit switched call is established.

There are also many situations where the user has to fall back to the circuit switched network to answer a call, but needs to quickly come back the LTE.

In addition, unless mention was made above to the contrary, it should be noted that all of the accompanying drawings are not to scale. It will be appreciated by persons skilled in the art that the present solution is not limited to what has been particularly shown and described herein above. A variety of modifications and variations are possible in light of the above teachings without departing from the scope and spirit of the described solution, which is limited only by the following claims.

We claim:

1. A method, in a Long Term Evolution (LTE) core network, of retaining a packet switched session during a circuit-switch fallback (CSFB) connection attempt between a wireless terminal and Circuit Switched (CS) core network, comprising:
   a) receiving a circuit-switch connection request at a node serving said wireless terminal;
   b) instructing said serving node to release said packet switched session between said wireless terminal and said serving node but delay the release of said packet switched session between said serving node and said LTE core network and initiating a timer hold function indicative of the time limit said wireless terminal's packet switched session is retained and the length of time context and Radio Resource Control (RRC) information associated with said wireless terminal is stored;
   c) forwarding said circuit switched connection request to said wireless terminal to establish a CSFB session on said CS core network; and
   d) maintaining said packet switched session until said wireless terminal ends said CSFB session but no later than expiry of said time limit.

2. A method as defined in claim 1, wherein said context and RRC information associated with said wireless terminal is stored in a buffer at said wireless terminal.

3. A method as defined in claim 2, wherein said context and RRC information associated with said wireless terminal is stored in a buffer at said serving node.

4. A method as defined in claim 1, wherein said packet switched session between said wireless terminal and said serving node is re-established if said CSFB session ends prior to expiry of said time limit or if registration of said wireless terminal to said CSFB session fails.

5. A method as defined in claim 1, wherein said packet switched session between said serving node and said LTE core network is released if said CSFB session ends after the expiry of said time limit.

6. A method as defined in claim 1, wherein said timer hold function is a fixed hold timer function.

7. A method as defined in claim 1, wherein said timer hold function is a variable hold timer function, and wherein said time delay varies according to network usage or session signal quality.

8. A method of operating a wireless terminal comprising:
   when already having a registration and/or session for a packet switched (PS) service with a Long Term Evolution (LTE) core network, making a registration for a circuit switched fall back (CSFB) session over a CS air interface with a circuit switched (CS) core network;
   the method characterized by: storing in a buffer context and Radio Resource Control (RRC) information associated with said wireless terminal for a predetermined time limit;
   releasing said packet switched session with a serving node of said LTE core network but delaying the release of context and RRC information associated with said packet switched session such that when said circuit switched registration is terminated, said wireless terminal can re-establish the original packet switched session with said serving node of said (LTE) core network.

9. The method of claim 8, further comprising the wireless terminal re-establishing said packet switched session if said CSFB session ends prior to expiry of said time limit or if registration of said wireless terminal to said CSFB session fails.

10. The method of claim 8, wherein said packet switched session between said serving node and said LTE core network is released if said CSFB session ends after the expiry of said time limit.

11. The method as defined in claim 10, wherein said time limit is fixed.

12. The method as defined in claim 10, wherein said time limit varies according to network usage or session signal quality.

13. A wireless terminal for operating on a packet switched session in a LTE core network and a circuit switched fall back (CSFB) session in a circuit switched (CS) core network, said wireless terminal comprising:
   a communication interface arranged to communicate over the CS core network air interface a message configured to make the registration for a CSFB session;
   a memory for performing a timer hold function and to store context information of said wireless terminal during said CSFB session; and
   a registration controller for registering the wireless terminal to a CSFB session over the CS core network air interface during a packet switched session, wherein the release of said context information associated with said packet switched session is delayed such that said wireless terminal can re-establish the original packet switched session when said circuit switched registration is terminated.

14. The wireless terminal as defined in claim 13, wherein said timer hold function is indicative of the time limit said wireless terminal's packet switched session and context information associated with said wireless terminal is retained.

15. The wireless terminal as defined in claim 14, wherein said packet switched session between said wireless terminal and said serving node is re-established if said CSFB session ends prior to expiry of said time limit or if registration of said wireless terminal to said CSFB session fails.

16. The wireless terminal as defined in claim 14, wherein said packet switched session between said serving node and said LTE core network is released if said CSFB session ends after the expiry of said time limit.

17. The wireless terminal as defined in claim 13, wherein said timer hold function is a fixed hold timer function.

18. The wireless terminal as defined claim 13, wherein said timer hold function is a variable hold timer function, and wherein said time delay varies according to network usage or session signal quality.

* * * * *